United States Patent
Wright

(10) Patent No.: US 11,392,691 B1
(45) Date of Patent: Jul. 19, 2022

(54) SYSTEM AND METHOD OF SECURING E-MAIL AGAINST PHISHING AND RANSOMWARE ATTACK

(71) Applicant: Desmond Wilfred Wright, Brownstown, MI (US)

(72) Inventor: Desmond Wilfred Wright, Brownstown, MI (US)

( * ) Notice: Subject to any disclaimer, the term of this patent is extended or adjusted under 35 U.S.C. 154(b) by 121 days.

(21) Appl. No.: 16/938,977

(22) Filed: Jul. 25, 2020

Related U.S. Application Data

(60) Provisional application No. 62/878,335, filed on Jul. 25, 2019.

(51) Int. Cl.
*H04L 29/06* (2006.01)
*G06F 21/55* (2013.01)
(Continued)

(52) U.S. Cl.
CPC .......... *G06F 21/554* (2013.01); *H04L 51/212* (2022.05); *H04L 63/101* (2013.01);
(Continued)

(58) Field of Classification Search
CPC ................ H04L 63/1416; H04L 63/20; H04L 2463/144; H04L 63/1425; H04L 63/145
(Continued)

(56) References Cited

U.S. PATENT DOCUMENTS 7,373,664 B2   5/2008  Kissel
7,831,672 B2 * 11/2010  Tsai .................... G06F 21/554
                                                    709/206
(Continued)

*Primary Examiner* — Longbit Chai
(74) *Attorney, Agent, or Firm* — Singh Law Firm PLLC; Gautam Bir Singh

(57) ABSTRACT

A system of averting phishing and ransomware attacks is disclosed wherein system comprises of a network of computers that exchange information to collaborate in sharing knowledge about the attack so that the other computers on the network are alerted and can successfully thwart similar attacks. This collaborative system relies on the end-point intelligence. That is, the computer that is the recipient entity of a malicious electronic mail message allows a review of the content of the message in a safe and sand-boxed environment, referred to as Safe View, and makes a determination regarding the maliciousness of the message. If indeed this message is determined to be malicious, the message is forwarded to an enterprise system on network that analyzes the message and gleans key metadata from it and distributes this information over the network to all the computer nodes on the network. Thus, the enterprise system saves the extracted metadata and key parameters in its database and instantaneously shares with all the systems on the network that utilize it for future analysis of electronic mail messages received. In this manner the individual nodes become better prepared to preemptively analyze and discard any malicious electronic mail messages that are in fact phishing or ransomware attacks. In addition to sharing the end-point intelligence of any one of the nodes with the rest of the network, the enterprise node may itself generate and share knowledge with all local nodes encapsulating information gathered from third parties regarding any prevalent trends, as well as information about malicious phishing or ransomware exploits as they become known in information security community.

20 Claims, 9 Drawing Sheets

(51) Int. Cl.
*H04L 9/40* (2022.01)
*H04L 51/212* (2022.01)

(52) U.S. Cl.
CPC ........ *H04L 63/145* (2013.01); *H04L 63/1483* (2013.01); *H04L 63/20* (2013.01); *G06F 2221/031* (2013.01)

(58) Field of Classification Search
USPC .......................................................... 726/1
See application file for complete search history.

(56) References Cited

U.S. PATENT DOCUMENTS

| | | |
|---|---|---|
| 7,996,475 B2 | 8/2011 | Drako et al. |
| 9,473,439 B2 | 10/2016 | Kay |
| 10,171,424 B2 * | 1/2019 | Brown .................... H04L 67/02 |
| 10,938,837 B2 * | 3/2021 | Kumar ................ H04L 63/1408 |
| 11,044,267 B2 * | 6/2021 | Jakobsson ............. H04L 63/123 |
| 2019/0190929 A1 | 6/2019 | Thomas et al. |

* cited by examiner

SYSTEM AND METHOD OF SECURING E-MAIL AGAINST PHISHING AND RANSOMWARE ATTACK

CROSS REFERENCE AND RELATED APPLICATION

The application claims the benefits of provisional patent Application Ser. No. 62/878,335 filed on Jul. 25, 2019, which is incorporated herewith by reference.

FIELD OF INVENTION

The field of the invention relates generally to computer systems and information security. In particular, the present method and system are directed to using computer to computer communications for a collaborative and proactive identification of phishing, ransomware, and other malicious email messages.

BACKGROUND

Emails have been used for many decades and are a predominant manner by which people communicate both in everyday life and as well as for work. The number of emails exchanged on a daily basis today exceeds several hundreds of billions and is expected to grow. While emails make communication easier, they also create opportunities for cyber thieves and hackers to exploit email users by techniques like phishing and ransomware and using the emails as vector to deliver malware to a recipient's.

Phishing is a form of fraud in which an attacker masquerades as a reputable entity or person in email to the victim. The goal of the attacker in a phishing attack is to use email to distribute malicious links or attachments which are intended to cause damage to the email recipient, and spoof them info disclosing valuable personal information by including active links in the emails that launch fake websites and trick the recipients into disclosing login credentials or financial account information from victims, or simply install malware on the recipient computer. Similarly, ransomware attack is a type of extortion where similar social engineering technique is used to trick the email recipient in installing malware that keeps the email recipient locked out of their computer until a ransom is paid.

Cyber-criminals masquerade as entities known to the recipient in launching phishing and ransomware attacks. Pretending to someone known to the recipient, the sender of a phishing or ransomware email preys on the unwary email recipient who is considerably more likely to click on a malicious link coming from someone who they believe is a co-worker, a manager or a friend. In this manner, by exploiting the implicit trust in a cleverly masqueraded sender's credentials, the cyber-criminals are able to penetrate through the otherwise hardened firewalls and similar computer perimeter defense systems.

Phishing and ransomware emails often slip through the perimeter defense, such as firewalls, set up by organizations' information technology departments. These are forms of social engineering attacks where the targets are unsuspecting users who click on a link or open an email attachment that then takes them to a malicious site or runs malicious code to infect their computer. Because these techniques rely on behavioral aspects of email recipients, they are generally difficult to control programmatically as attackers shift tactics constantly requiring vigilance by the email recipients.

There are multiple tools that provide perimeter defenses offered by major email gateways vendors. Some of the products on the market for centralized perimeter email filtering include, but are not limited to, Symantec Mail Gateway, Forcepoint Mail Gateway, Barracuda Mail Gateway, and Sophos Mail Gateway. Other companies that provide network security products include Arbor Networks, Cisco Systems, F5 Networks, BlueCoat, Brocade Communications, Citrix Systems, RadWare, Barracuda, JetNexus, Kemp Technologies, A10 Networks, CAI Networks, Coyote Point Systems, Crescendo Networks, StrangeLoop Networks, Stamped Technologies, and Zeus Technology, among others.

These centralized security products are similar since they perform content based and metadata analysis of the email in a centralized setting without affording a chance to the intended recipient to help identify and eliminate any potential phishing and ransomware attacks. Thus, if the email makes it to the user's incoming mailbox, there is no further protection that the existing tools can offer. In that regard their behavior is the same across the board—once the malicious email passes the perimeter gateway, they leave the users vulnerable to attacks.

What is needed is a strategy that focuses on the end user and endpoint systems also as a line of defense for removing that vulnerability and keep the users and organization secure. End users and recipients of an email are the most knowledgeable and possibly the best equipped to recognize a malicious email message that targets them. What is needed is a system that lets the email recipients view a suspicious email in a sandbox of protected environment and letting them, rather than a centralized system, decide whether they believe the email is malicious. What is needed is a system that leverages the background knowledge of the recipient in making this classification in a manner that is safe. What is also needed is to have the background knowledge of one email recipient be shared within the group. Thus, what is needed is a system, that learns from one user and propagates this knowledge to the other users. What is also needed is having an ability for the system to share the final classification of a potential email by the user with rest of the community enabling all to benefit from the knowledge of one of the members.

SUMMARY

It should be appreciated that the system and the method disclosed in this application are designed to become engaged upon the email reaching the end-user. That is the email has passed the checks of and was deemed acceptable by the centralized monitoring systems discussed in the Background section above.

Enabling the entire community of users working on a local network to benefit from the classification of a malicious email by one of the members of the social group is a collaborative intelligence capability effectuated by the disclosed embodiments. It is desirable to inject the domain knowledge from the target of phishing or ransomware attack into its further prevention. Letting the end users view the email in a protected environment and pointing to them the reasons why the system classified the email may as potentially malicious helps end user make an affirmative and final determination about the maliciousness of the email. The system disclosed enables in using computer internetworking capabilities to propagate the results of the end user classification from a local node to across the entire enterprise for the benefit of all other nodes. In this manner, the countermeasures are continually and collectively enhanced the level of vigilance exercised in countering these threats becomes manifold amplified as each node takes advantage of the knowledge of every other node in the network.

A significant strategy for combating the threat of phishing and ransomware attacks is to augment the use of information security technology with intelligence of individuals targeted in helping avert future attacks since the social engineering cyber-attacks rely on personal information, they are best averted by patching the personal information relied on. However, this has to be done at a high speed since the attack launcher will try to send a phishing email, for example, from the group's boss to everyone in the group. If the email is recognized by one member of the group to be an attempted phishing, the knowledge about the attacker—such as their internet address, their gateway, their email address, any specific content trigger in the subject line, etc., must be distributed to the rest of group very fast so that the remaining systems collaborating on the network can avert the attack by deleting the email upon receipt. Thus, the system and the process disclosed rely on high speed implementation by processing a database of known patterns, analyzing the phishing or ransomware email message, updating the database, and distributing the updates to the database to all the collaborating computers on the network. The high-speed processing, robustness in implementation and high speed network distributions are key to the implementation and success of the disclosed system and method.

The system disclosed comprises of a local system that runs on each node for each client, where each client acts collaboratively with a centralized enterprise system that takes knowledge from individual local nodes and disseminates to all the nodes. In this manner the enterprise as a relay of knowledge. In an embodiment of the system the enterprise node may be replaced by the local node directly communicating with every other node in the system thereby following a distributed intelligence paradigm for knowledge sharing.

The system disclosed comprises an enterprise system and a plurality of local systems with each of the local systems adapted to receive an email and further includes a local processor configured to execute a local computer implemented method, a local database of security rules, a local network interface configured to communicate with an enterprise network interface, and a user interface; wherein the local processor executes the local computer implemented method performing the steps of analyzing the email, using one or more security rules, producing a security threat level for the email, and performing one or more of a plurality of actions on the email where the action performed is a function of the security threat level, wherein one of the actions includes performing a display of the email and receiving an input from a user in response, and forwarding the email and the user input to the enterprise system; the enterprise system adapted to receive the email and user input from any of the plurality of local systems, and further includes an enterprise processor configured to execute an enterprise computer implemented method, an enterprise database of enterprise security rules, the enterprise network interface configured to communicate with each of the plurality of local network interfaces; wherein the enterprise processor executing the enterprise computer implemented method performs the steps of analyzing the email, the user input, and the enterprise security rules, determining if enterprise security rules need updating, and creating new enterprise security rules, updating the enterprise security rules, or creating new enterprise security rules and updating enterprise security rules, and communicating the new or the updated enterprise security rules to the plurality of local systems over the enterprise network interface. The system is further configured for each of the plurality of local systems to receive the new or the updated enterprise security rules from the enterprise server and perform an update of their respective local databases of the local security rules to be in synchronization with the enterprise database of security rules. The system is further configured so one of the plurality of actions performed by the local computer implemented method is a deletion of the email.

The system further includes the email that further includes a header, a body, and a metadata wherein the metadata includes a recipient email identifier including a recipient Internet domain, a sender email identifier including a sender Internet domain, a sender email server address, and a plurality of sender gateway addresses; and deletion of the email results having the local computer implemented method bypassing the user input step and forwarding of the metadata of the email and a special code to the enterprise system. Further, in an embodiment of the system the deletion of the email results in having the local computer implemented method bypassing the user input step and forwarding of the email and a special code to the enterprise system.

An embodiment of the system further has the enterprise system including an enterprise user interface; and the enterprise computer implemented method is configured to receive an input from the enterprise user interface, wherein the enterprise user input is further included in the step of analyzing the email, the user input, and the enterprise security. In an embodiment of the system the email further includes a plurality of file attachments and a plurality of active components where the active components are configured to cause an action, where the performing of the display of the email by the local computer implemented method uses a safe mode configured to disable a viewing and a saving of the file attachments and disable the actions of the active components.

This ongoing communication between the nodes, whether through a centralized node like an enterprise node, or directly with other allows for a rapid sharing of information. The high speed, efficient and robust knowledge shared thereby thwarts the possibility of other nodes of a networked group from falling prey to a social engineering attack successfully detected by one of the nodes. The local nodes in an embodiment also communicate directly with each other without the need of an intermediary. In this manner the interacting computer systems exhibit a behavior of distributed intelligence that becomes possible through their high speed interconnectivity over a high speed data network that lets them exchange information that patches vulnerabilities at high speed before the opportunity for the attacker to scan one system after another looking for an unsuspecting victim.

The process comprises having a local system, where a local system includes a processor configured to execute computer implemented methods, a database of security rules, a network interface, and a user interface; having a local system receive an email over the network interface; having the local system receive a classification value for the email from a computer implemented method configured to apply the security rules to the email and produce the classification value; having the local system cause a deletion of the email for a first classification value, a display of the email in a safe mode for a second classification value, or a display of the email in a normal mode for a third classification value; having the local system receive a user input in response to the display of the email in the safe mode, and further having the local system send the email and the user input to an enterprise system, and having the local system cause the enterprise system to change one or more of the security rules, or add one or more new security rules, in response to the forwarding of the email and the user input. Furthermore, when email includes a plurality of file attachments and a plurality of active components where the active components are configured to cause an action, where the display of the email in the normal mode is configured to allow a viewing and a saving of the file attachments and allow the actions of the active components, and the display of the email in the safe mode is configured to disable the viewing and the saving of the file attachments and disallow the actions of the active components, and further configured to receive the user input.

Thus, the end user examines the email in a safe mode and makes a determination about the maliciousness. It will be appreciated that in some cases the email is not presented in the safe view mode because the local system is certain about the maliciousness of the email and disposed it without seeking any affirmative input from the end-user.

One of the key indicators of the email being a malicious email is in the content of the email itself. Often time such emails will utilize certain keywords or trigger words, use incorrect grammatical structure, or contain capitalization and typographical errors, or connect disparate facts not necessarily belonging together. A semantic analysis of the message, in an of itself, is utilized to determine if the email is a malicious attack.

A semantic analysis of the message, hereafter referred to as Content Pattern Analysis, is the process of looking at the email content for the presence of certain trigger words in the main body, subject heading or the meta-data (header) itself. An approximate string-matching algorithm may be utilized for computing the string edit distances of the words in the message against a database of predefined words and regular expressions. If the message contains any of the words or regular expressions, the message is automatically deleted.

A process embodiment disclosed includes an email having the email include a header and a body; having the database of security rules include a plurality of content patterns wherein each content pattern represents one or more of predefined character strings; and having the computer implemented method produce the first classification value, i.e. delete message, where at least one of the content patterns matches the header or matches the body of the email.

Additionally, the Internet or IP address of the mail server where a message originated provides useful information with regards to message's malicious nature. Once a message is determined to be malicious, the originating mail server is added to a list of blacklisted mail servers. Recognizing that a phishing or ransomware attack may come from a temporarily compromised but a legitimate mail server, any messages from a blacklisted mail server are analyzed and possibly retained if the email server belongs to the mail servers of an organization's business partners. Unless this business partner exception applies, this ensure that a malicious mail server cannot be used to conduct future phishing and ransomware attacks.

A process embodiment disclosed includes having the email include a metadata comprising a sender email identifier; having the database of security rules include a plurality of a blacklisted email identifier patterns wherein each blacklisted email pattern represents one or more of predefined email addresses, and having the computer implemented method produce the first classification value, i.e. delete email, when at least one of the blacklisted email identifier patterns matches the sender email identifier.

A process embodiment disclosed includes having the email include a metadata comprising a plurality of sender gateway addresses; having the database of security rules include a plurality of blacklisted gateway patterns wherein each blacklisted gateway pattern represents one or more of predefined gateway addresses, and having the computer implemented method produce the first classification value, i.e. delete email, when at least one of the blacklisted gateway patterns matches at least one of the plurality of sender gateway addresses.

A three-stage processing is utilized in an embodiment of the invention. First, the content of the message is analyzed to determine if the message is malicious. If the message passes this first test, the message is analyzed to determine the originating mail server. If the originating email address, or the originating mail server is on a list of known blacklisted mail-servers but not on the list of an organization's business partners' mail server, the message will be deleted. And third, the originating email sender's domain name is matched against the IP address of the originating email to determine if the email address is being spoofed through a re-mailer, in which case again the message will be deleted.

A process embodiment disclosed includes having the email comprising a header, a body, and a metadata wherein the metadata further includes a recipient email identifier including a recipient Internet domain, a sender email identifier including a sender Internet domain, a sender email server address, and a plurality of sender gateway addresses; having the database of security rules include a plurality of content patterns wherein each content pattern represents one or more of predefined character strings, a plurality of a blacklisted email identifier patterns wherein each blacklisted email identifier pattern represents one or more of predefined email identifiers, a plurality of blacklisted gateway patterns wherein each blacklisted gateway pattern represents one or more of predefined gateway addresses, a plurality of internal gateway patterns wherein each internal gateway pattern represents one or more of predefined internal gateway addresses, and a plurality of trusted partner patterns wherein each trusted partner pattern represents one or more of predefined Internet domains.

A process embodiment disclosed further includes having the computer implemented method produce the second classification, i.e. safe view mode, where content patterns fail to match the header or the body of the email, blacklisted email identifier patterns fail to match the sender email identifier, blacklisted gateway patterns fail to match the sender gateway addresses, and trusted partner patterns fail to match the sender Internet domain.

A process embodiment disclosed further includes having the computer implemented method produce the third classification, i.e. normal view mode, where content patterns fail to match the header or the body of the email, blacklisted email identifier patterns fail to match the sender email identifier, blacklisted gateway patterns fail to match the sender gateway addresses, and trusted partner patterns matches the sender Internet domain.

A process embodiment process disclosed further includes having the computer implemented method produce the second classification, i.e. safe view mode, where the sender Internet domain and the recipient Internet domain have an identical value, and internal gateway pattern fails to match at least one the plurality of sender gateway addresses. And, the process disclosed further includes having the computer implemented method produce the third classification, i.e.

normal view mode, where the sender Internet domain and the recipient Internet domain have an identical value, and internal gateway pattern matches all of the plurality of sender gateway addresses.

System running in the background will remove the message from the local user's incoming mailbox and move it to the junk or trash folder. Additionally, the Local E-Mail Monitoring System will forward the message to the Enterprise Level E-Mail Monitoring System which will analyze the message and share any new knowledge about the malicious attack with all of the Local E-Mail Monitoring Systems running on the network.

In certain cases where the maliciousness of an email message cannot be determined with certainty, the local system enables the recipient of the message a capability to safely view the message. In this "Safe View" mode, the message is viewed by the recipient with all of its malicious capabilities neutralized. That is, all of the hyperlinks and attachments are disabled. In the Safe View mode, the email recipient cannot click on any links or open any attachments and thereby fall prey to a social engineering attack. Furthermore, the URL behind every hyperlink or email address in the message is flattened out for the user to view and determine if the sender is trying to masquerade their identify. In the Safe View, the local system analyzes the content and highlights any potentially suspect sections of the message.

When the message is presented in a Safe View, the recipient of the message has to make a determination as to whether they accept the message, reject the message, or defer this decision to the organization's IT department for further review. If the message is accepted, its' view becomes a normal view allowing the recipient to follow hyperlinks or save any attachments. If the message is rejected or deferred to the IT department however, the message is deleted from the recipient's incoming mailbox and forwarded to the enterprise system.

If the enterprise level email monitoring system receives an email message that was rejected and forwarded from one of the client machines, it is analyzed for new knowledge and its meta-data is gleaned, saved into an enterprise database, and shared with all of the local email monitoring system running on all the nodes on the network. In this manner a distributed intelligence model is utilized which not only alleviates the IT staff from looking at all suspicious messages but also leverages the subjective knowledge of the users and their unique circumstances making them better equipped to recognize the attack.

If on the other hand the recipient defers the classification of the message to the IT staff, it is queued up for a manual review. After the completion of the manual review the IT staff could confirm the message as being good and route it back with the override that message has been analyzed and confirmed to be non-malicious. If the recipient determines the message to be malicious, the message is deleted, and any additional knowledge gleaned from the message is shared with all of the local systems.

As a general rule, most of the email communication that a business receives is from their trusted business partners. In that regard, the invention disclosed allows the specification of a plurality of mail servers that are associated with each of their business partner. If the email message is being sent from a purported business partner, the local email monitoring system checks to ensure that the mail server that sent the email was one of the mail servers associated with the business partner's domain. The message is allowed to be viewed normally by the recipient if this is indeed true. However, if the sender's email address is not associated with a business partner, the sender's email address is checked against a list of known bad sender's that have been blacklisted by the organization as stored in the enterprise database. These messages are automatically rejected by the local email monitoring system and forwarded to the enterprise email monitoring system for record keeping.

If the email message sender's address is not blacklisted however, the message is displayed in Safe View mode allowing the recipient to decide if the message is malicious. If the recipient determines the message to be malicious or defers the review for IT department it is handed over to the enterprise system. The sender's email address is added to the local bad sender list, or to the global bad senders list by the IT department. The global bad sender list is replicated by recipients on the enterprise's network. A message determined by the recipient to be legitimate is displayed normally by the recipient's email client.

An embodiment of the process enables a plurality of computers to cooperate with each other directly without the need for an intermediary computer like the enterprise node. An embodiment of the process comprises having a computer system, where a system includes a processor configured to execute software programmed methods, a database of security rules, a network interface, and a user interface; having a computer system receive an email over the network interface; having the computer system receive a classification value for the email from using a first software programmed method configured to apply the security rules to the email and produce the classification value; having the computer system cause a deletion of the email for a first classification value, a display of the email in a safe mode for a second classification value, or a display of the email in a normal mode for a third classification value; having the computer system receive a user input in response to the display of the email in the safe mode, and further having the computer system cause an update of security rules by a second software programmed method configured to use the email and the user input; and having the computer system cause the second software implemented method to communicate changes to the security rules over the network interface to any computer systems connected to the network.

The process of embodiment having the email further includes a plurality of file attachments and a plurality of active components where the active components are configured to cause an action, where the display of the email in the normal mode is configured to allow a viewing and a saving of the file attachments and allow the actions of the active components, and the display of the email in the safe mode is configured to disable the viewing and the saving of the file attachments and disallow the actions of the active components, and further configured to receive the user input.

The process embodiment further having the deletion of the email by the first software program method is configured to cause the second software programmed method to update the security rules based on a header, a body, and a metadata of the email.

The invention accordingly comprises the several steps and the relation of one or more of such steps with respect to each of the others, and the apparatus embodying features of construction, combinations of elements and arrangement of parts that are adapted to affect such steps, all is exemplified in the following detailed disclosure, and the scope of the invention will be indicated in the claims.

BRIEF DESCRIPTION OF THE DRAWINGS

The structure, operation, and advantages of the present invention will become further apparent upon consideration of the following description taken in conjunction with the accompanying figures (FIGs). The figures are intended to be illustrative, not limiting. Certain elements in some of the figures may be omitted, or illustrated not-to-scale, for illustrative clarity. Similar elements may be referred to by similar numbers in various figures (FIGs) of the drawing.

DETAILED DESCRIPTION

Figure 1:
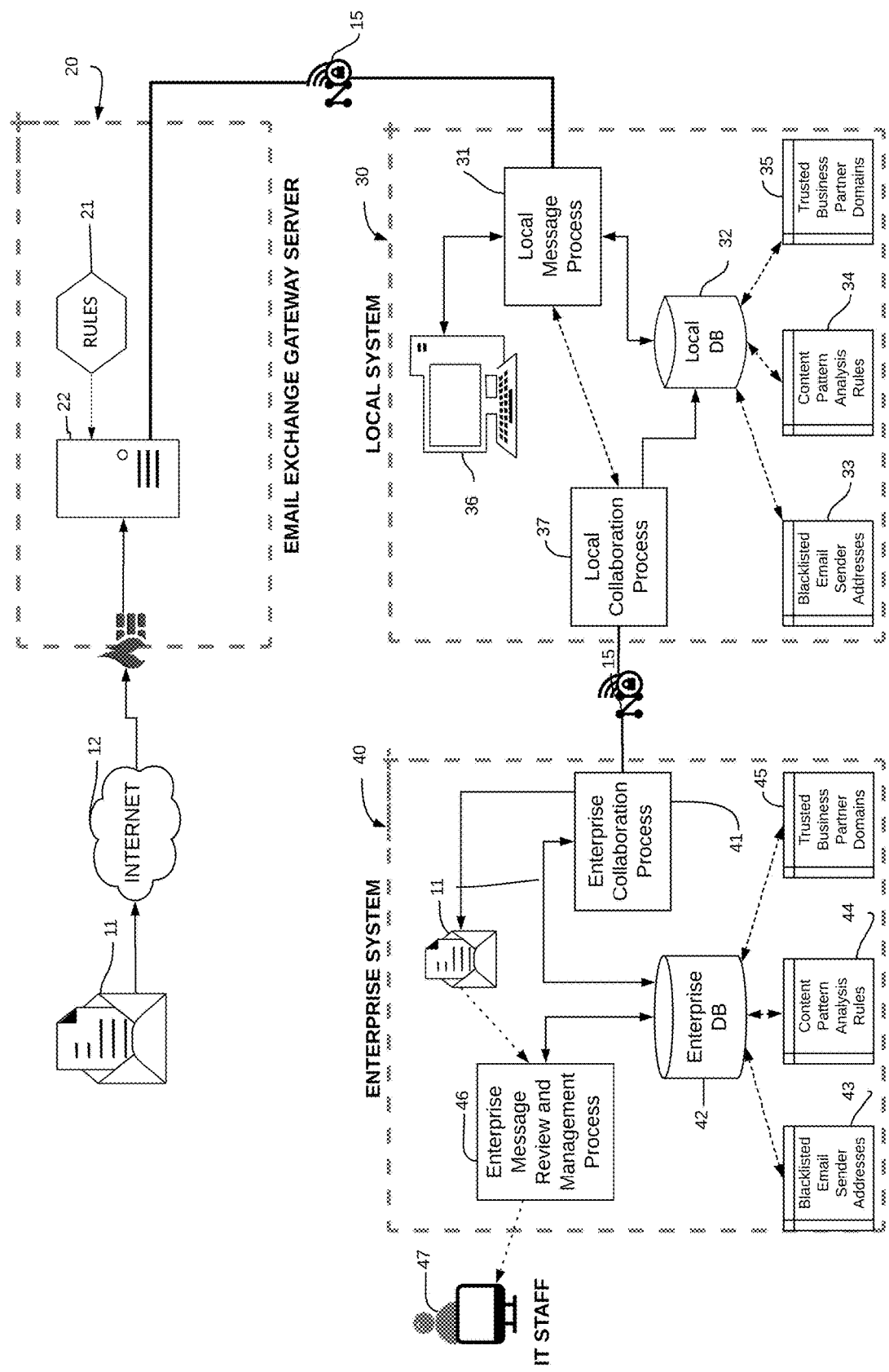
FIG. 1 shows an embodiment of the inventive process of receiving, analyzing and disposing of an email message through a collaboration between the local email monitoring software system running on all notes and enterprise email monitoring software in continual communication with all of the local monitoring processes.

Features, including various novel details of implementation and combination of elements will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

While the invention may be susceptible to embodiment in different forms, there is shown in the drawings, and herein will be described in detail, a specific embodiment with the understanding that the present disclosure is to be considered exemplifications of the principles of the invention, and is not intended to limit the invention to that as illustrated and described herein.

The arrangement in FIG. 1 shows an embodiment of the inventive process of receiving, analyzing and disposing of an email message through a collaboration between the local email monitoring software system running on all notes and enterprise email monitoring software in continual communication with all of the local monitoring. Illustrated in FIG. 1 are the two primary subcomponents of the invention, namely the Local System 30 which is a subsystem running on each client machine, and the Enterprise System 40 which runs on centralized server(s) for supporting client collaborative and crowdsourcing activities. The embodiment shows an exemplary arrangement wherein the computing system components involved in the interactions are illustrated in detail and discussed below.

As illustrated in FIG. 1, an E-Mail Message 11 or an electronic mail (E-Mail) message coming in from the Internet 12 has to pass through an organization's Fire-Wall 23 provided for separating the Internet 12 traffic and organization's Local Area Network 15. Next, the E-Mail Message 11 is processed by the Mail Exchange Gateway 20 which includes the E-Mail Server 22. It will be recognized by one skilled in the art that E-Mail Server 22 relies on a set of Mail Server Rules 21 that are designed to thwart known exploits and are the first line of defense albeit operating at a very high level without having knowledge of the specific life situations typically utilized in social engineering attacks such as phishing and ransomware.

People, such as employees in an organization, are the intended recipients of the E-Mail Message 11. As will be appreciated by one skilled in the art, people within an organization are typically able to sign into any of the machines on the Local Area Network 15 and retrieve their email messages. At a conceptual level a Local Area Network 15 is an organization's local area network, Intranet or LAN, using wired and secure wireless protocols for enabling communication between an organization's computers and devices. Local Area Network 15 has several Client Node 36 with Local System 30 installed which is a subsystem running on each client machine. The various components of this subsystem Local System 30 are described next.

The core message processing on Local System 30 is performed by the Local Message Processor 31 which is process running on client node responsible for examining incoming email messages. The Local System 30 utilizes a Local Database 32—local database stored on the client node used for examining incoming email messages. There are several components of the Local Database 32. These include (i) Table of Local List of Content Patterns 34, which is a table stored locally on each client node codifying patterns used in email content analysis; (ii) Table of Local List of Blacklisted Email Addresses 33, which is a table of known hackers or spammer email addresses stored locally on the client node; and (iii) Table of Local List of Trusted Partner Domain Names 35, which is a table stored locally on each client containing domain addresses and known mail server IP addresses for trusted business partners.

The Local Message Processor 31 retrieves the emails from the E-Mail Server 22 and analyzes them for maliciousness using the information stored in Local Database 32 and its various components discussed above. The Local Message Processor 31 also allows the intended recipient of the message to participate in this decision-making process. If as a result of this analysis, Local Message Processor 31 determines that the message is malicious, it relays this information to Local Collaboration Process 37 which is a process running on each client node dedicated to exchanging information with a corresponding enterprise collaboration process. If the results of the analysis by Local Message Processor 31 are inconclusive, the message is conveyed to the Local Collaboration Process 37 with an additional indication that an intervention in needed by Enterprise Security Monitors 47, i.e. organization's Information Technology (IT) staff establishing security policies, developing content pattern analysis rules, and managing the domains and mail server addresses for business partners each of these aspects being described below.

In describing the workings of Enterprise System 40, it will be appreciated by a person skilled in the art that it is a software running on centrally accessible servers for supporting information exchange between plurality of Local System 30 for detecting suspicious activities. The main functionality of the Enterprise System 40 is to collect novel knowledge about phishing, ransomware, or other malicious attacks from all client Local System 30 and create a centralized knowledge base for re-distributing back to all client Local System 30. Enterprise System 40 accomplishes this goal by incorporating a Enterprise Collaboration Process 41 acting as a receiver of information and copies of malicious email messages from all Local System 30 on the Local Area Network 15. Thus Enterprise Collaboration Process 41 is a process acting as a central repository of knowledge shared with all local nodes on the Local Area Network 15. The Enterprise System 40 maintains the Enterprise Database 42 which is a central repository, i.e. enterprise database stored representing the collected knowledge for sharing with all local processes running on Local System 30. The components of the Enterprise Database 42 are: (i) Enterprise Level Table of Content Patterns 44, which are enterprise-wide table patterns used in email message analysis by the enterprise; (ii) Enterprise Level Table of Blacklisted Email Addresses 43, which is an enterprise-wide table of known hackers or spammer email addresses known to the enterprise; and (iii) Enterprise's Table of Trusted Partner Domain Names 45, which is an enterprise-wide table of enterprise's trusted partners including their domain names and known mail server addresses.

The main processing within the Enterprise System 40 is performed by Enterprise Message Review and Management Process 46 which is also the process responsible for interacting with the Enterprise Security Monitors 47 security administrators as well as responsible for analyzing the email messages deferred by and forwarded to it. The Enterprise Message Review and Management Process 46 manages the Enterprise Database 42 and periodically shares updates of the Enterprise Database 42 with the Local Message Processor 31 and Enterprise Collaboration Process 41, with REF Local Collaboration Process 37 acting as an intermediary of this information exchange. Additionally, the Enterprise Message Review and Management Process 46 provides an interface to the Enterprise Security Monitors 47 that enables a direct specification of new content pattern rules at the enterprise level by adding entries into Enterprise Level Table of Content Patterns 44, adding email addresses and domains to the table of blacklisted senders in Enterprise Level Table of Blacklisted Email Addresses 43, or adding information about new trusted partners in Enterprise's Table of Trusted Partner Domain Names 45. These changes are then propagated to all the Local System 30, are saved in all the Local Database 32 and used by all of the Local Message Processor 31 across the enterprise.

Figure 2:
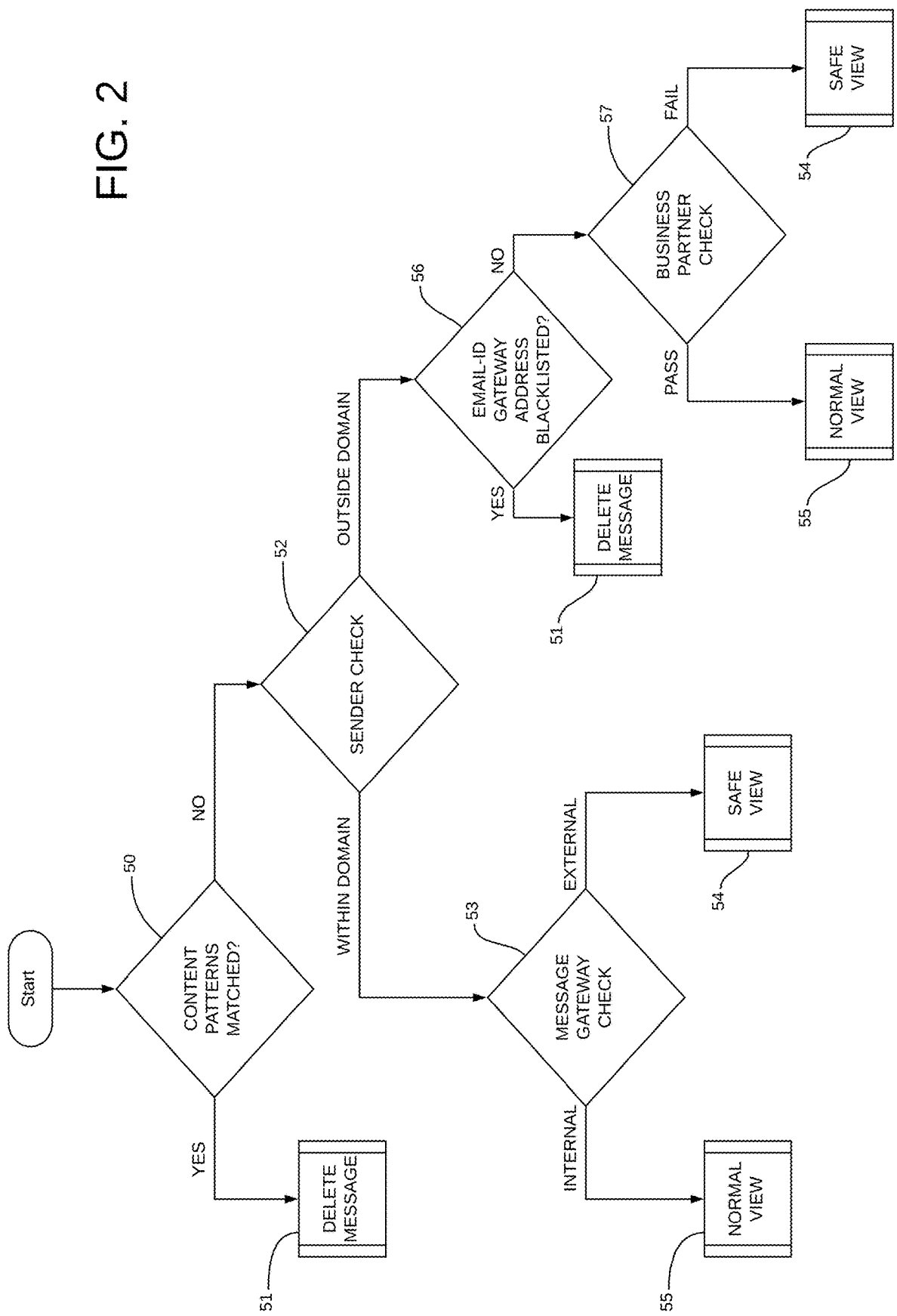
FIG. 2 shows the logic for the decision process utilized by the local email monitoring processes in classifying an email message.

The illustration in FIG. 2 shows the logic for the decision process utilized by the local email monitoring processes in classifying an email message. In an embodiment, the flowchart depicted in FIG. 2 forms a basis of a security threat assessment. The security threat level would be considered high for the conditions that lead to a processing action where the E-Mail Message 11 is in fact deleted. This is the case for blocks labelled Delete Message 51. The security threat level could be deemed medium when the conditions in the flow lead to processing block where the E-Mail Message 11 is offered for viewing within a Safe View Mode 60. This would be the case for blocks labelled Safe View Display 54. And, the security threat level would be considered low when E-Mail Message 11 is allowed to be viewed normally. This would be the case for blocks labelled Normal Display 55.

In FIG. 2 the logical processing steps utilized by the Local Message Processor 31 are described. This is the analysis process utilized at each local node that receives an email. The process begins by Content Patterns Analysis Check 50 which checks to see if the email message contains or matches one or more of the content patterns that are known indicators that the email has a malicious purpose. This is a vital check. Any E-Mail Message 11 failing this check reaches the state Delete Message 51 which prevents the message from ever reaching the user's Inbox and also resulting in the message getting forwarded to Enterprise System 40.

Typical set of content patterns analyze information such as: the message format, message header and any typographical errors indicative of foreign origination, overall size, tone and type of the message, usage of some keywords, address information for the person signing the email compared to the geolocation of the email origination server internet address, and in addition a look up against a dictionary of known words and regular expressions indicative of a phishing attack. In an embodiment of the system, the content patterns are supplied from third party security experts.

An E-Mail Message 11 passing this check is subjected next to Sender's Domain Check 52 which aims to determine if the sender belongs to one of the enterprises' domains—i.e. it's an internal message from a co-worker for example. If this check results in indicating that the sender is within the recipient's domain, the message is subjected to Sender's Gate Way Check 53 for determining if the email message's headers indicate if the email message was routed through an external gateway, rather than coming directly from an internal mail gateway, which would be suspicious since the internal messages will typically not need to get routed through external gateways.

The rule being the messages from co-workers within the domain will not need to be routed through an external mail server gateway. If this check does indicate that the message was routed through an external gateway, the message is subjected to a Safe View Display 54 which entails displaying the message in an inert sandbox (i.e. view only) window where viewing an image of the message with no active programs or hyperlinks enabled will not cause any harm. On the other hand, if the internal message never passed through an external gateway outside the organization, the message may be read in Normal Display 55 where the message is displayed normally with all the hyperlinks and attachments are active.

If the email address of the sender is outside of the organization's domain, as indicated by the branch Outside Domain in FIG. 2, the message is subjected to Blacklisted Email Check 56 which entails checking the sender's email against a database of known hackers and spammers' email addresses and mail gateways. Any E-Mail Message 11 failing this check reaches the state of Delete Message 51.

In an embodiment, the database of email addresses know to be associated with hackers is utilized. These emails are specified as patterns representing email addresses, such as 6_somename_inc@gmail.com, or as regular expression patterns covering a large range of email addresses such as 6*inc@gmail.com. An embodiment also utilizes a set of patterns of bad sender domains, gateways, or a range of IPv4 and IPv6 addresses that are used in designating a series of addresses known to be associated with malware launches, such as A.B.C.D, or A.B.C.X, or A.B.X.Y to cover a broad range of IP address as can be appreciated by a person skilled in the art.

A message passing this check is next subject to Business Partner Check 57 which entails checking to see if the sender's domain matches or belongs to one of the business partners and verifying that the email originated from one of their known email exchange servers. An E-Mail Message 11 passing this check may be read using Normal Display 55. An E-Mail Message 11 failing this check is subjected to Safe View Display 54.

Business partners are specified as a set of Internet domain names and IP addresses both in IPv4 and IPv6 format. Business partner domain names are an exception to the rule and therefore configured narrowly. Business partners would be indicated as MinixSoft.Com and their corresponding IP address. Additionally, the addresses of their known mail gateways are stored to ensure that the email actually is originating from the business partner and not that a specific email address has been compromised.

Figure 3:
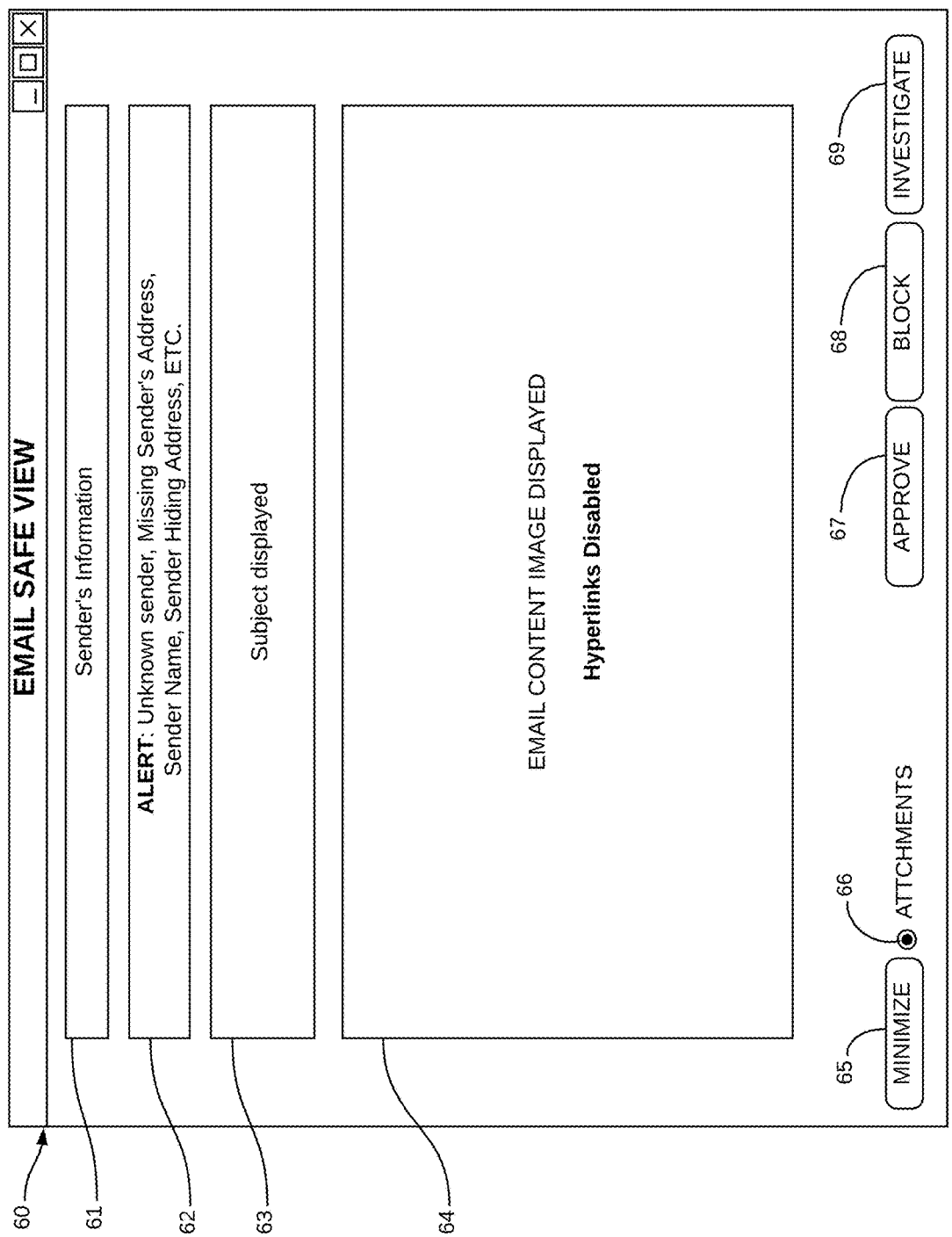
FIG. 3 illustrates a wire-frame rendition of the interface utilized by the Safe View module of the local email monitoring process for presenting a sandboxed view of the email on computer screen.

FIG. 3 illustrates a wire-frame rendition of the interface utilized by the Safe View module of the local email monitoring process for presenting a sandboxed view of the email on computer screen. In FIG. 3 the display of the message is in Safe View Display 54 which is a message display designed to allow the recipient to preview the message in a sandbox where the recipient cannot perform any actions and inadvertently fall prey to a phishing or ransomware attacks since the malware attached to the message are rendered inert and any hyperlinks embedded in the text of the message are disabled. Messages subjected to Safe View Display 54 are forwarded to the recipient's incoming mailbox or Inbox only if the recipient accepts the message after having reviewed it in the Safe View Display 54 mode.

The Safe View Display 54 includes a Sender Information 61 where sender information is displayed along with any background information that is known to the Local System 30 about the sender. Furthermore, the recipient is alerted with an analysis results of the E-Mail Message 11 that caused the message to be displayed in Safe View Display 54. Specifically, the Alert Information 62 is designed to draw attention to some common-place scenarios indicative of social engineering attacks, including missing sender's name or email address, hidden addresses, or the message originating from known re-mailers. Furthermore, Safe View Display 54 includes an Email Subject 63 where purported subject of the email is analyzed to determine if the subject matches a known exploit.

As illustrated in FIG. 3, the Email Content 64 section displays content with all hyperlinks disabled and a further analysis of typographical, language usage, and punctuation errors typically observed in malicious emails. The Minimize Button 65 is configured to allow window to be minimized. In addition, other buttons are included in some embodiments that allow the Safe View Display 54 for the user to safely view the message as an image. Such controls allow the user to view first part of the message only or scroll down the entire message image. The controls, such as buttons, allow the user to reduce or expand the content of the message shown in Safe View Display 54. The button Has Attachment 66 which indicates if the email contains attachment(s). However, no attachments are ever opened, and no attached programs are ever executed in the Safe View Mode 60.

All of the elements of the display in Safe View Mode 60 are designed to help the email recipient make a determination about the maliciousness or legitimacy of the E-Mail Message 11. Email recipient has one of three options to choose from in Safe View Mode 60. They can either (i) Approve 67 the E-Mail Message 11 when recipient determines the E-Mail Message 11 to be legitimate. The recipient's choice is conveyed and recorded by Local Message Processor 31; (ii) Block 68 the message when recipient recognizes the E-Mail Message 11 to be malicious and blocks it, moving it to the junk folder as well as causing it to be forwarded to the Enterprise Message Review and Management Process 46; or (iii) Defer for Investigation 69 the message when recipient is unsure about the message and chooses to defer making a decision and forwards it to Enterprise Security Monitors 47 for further analysis and processing. Approved messages are allowed to proceed to the recipient's email box. Blocked messages are deleted from recipient's inbox and placed into the junk folder in an embodiment of the invention. The final disposition and processing of messages deferred for investigation is decided by the Enterprise Security Monitors 47.

In response to the deletion or rejection of Safe View Display 54 message, the Enterprise System 40 system executes a process to review the email and adds the email identifier of the sender to the bad sender pattern and adds it to Enterprise Level Table of Blacklisted Email Addresses 43, further analyses the content of the email to identify any content that could potentially be added to the content pattern table Enterprise Level Table of Content Patterns 44, and also analyzes the sender mail gateway and where the message originated and adds it to the Enterprise Level Table of Blacklisted Email Addresses 43 table. A further analysis by the E-Mail Message 11 is performed by the Enterprise Security Monitors 47 and any additional rules are added to the Enterprise Database 42. All changes and additions to the Enterprise Database 42 are communicated to the Local Database 32 on a continuous basis.

The deletion of an E-Mail Message 11 is communicated to the Enterprise System 40 with a special code. This enables the Enterprise System 40 to review the E-Mail Message 11 and check what additional updates may be made to the various tables of Enterprise Database 42, particularly the Enterprise Level Table of Blacklisted Email Addresses 43 and Enterprise Level Table of Content Patterns 44 tables based on the sender identified and gateway information as well as the analysis of the content of the email. Generally, the deletion of an E-Mail Message 11 on a pattern matching from one of the tables could provide grounds for adding other patterns in the Enterprise Database 42.

It will be appreciated by a skilled artisan that the power of the disclosed system and method lies in the speed of processing. That is, labeling of denial on a Safe View Display 54 by one of the Local System 30 nodes should instantaneously be communicated to the Enterprise System 40 which in turn should update the database Enterprise Database 42 instantaneously and update the individual database Local Database 32 of all of the plurality of Local System 30 nodes instantaneously. The speed which one Local System 30 node effectively communicates the knowledge to all other Local System 30 nodes is vital to the overall success of the system. The success of the system therefore depends on efficient computer processing, fast databases, and high-speed networking. In this manner, the Local Database 32 of a single Local System 30 gets synchronized with the Enterprise Database 42 of the Enterprise System 40. And the Enterprise System 40 in turn synchronizes the Enterprise Database 42 with all of the plurality of Local System 30 nodes and their respective databases Local Database 32.

Figure 4:
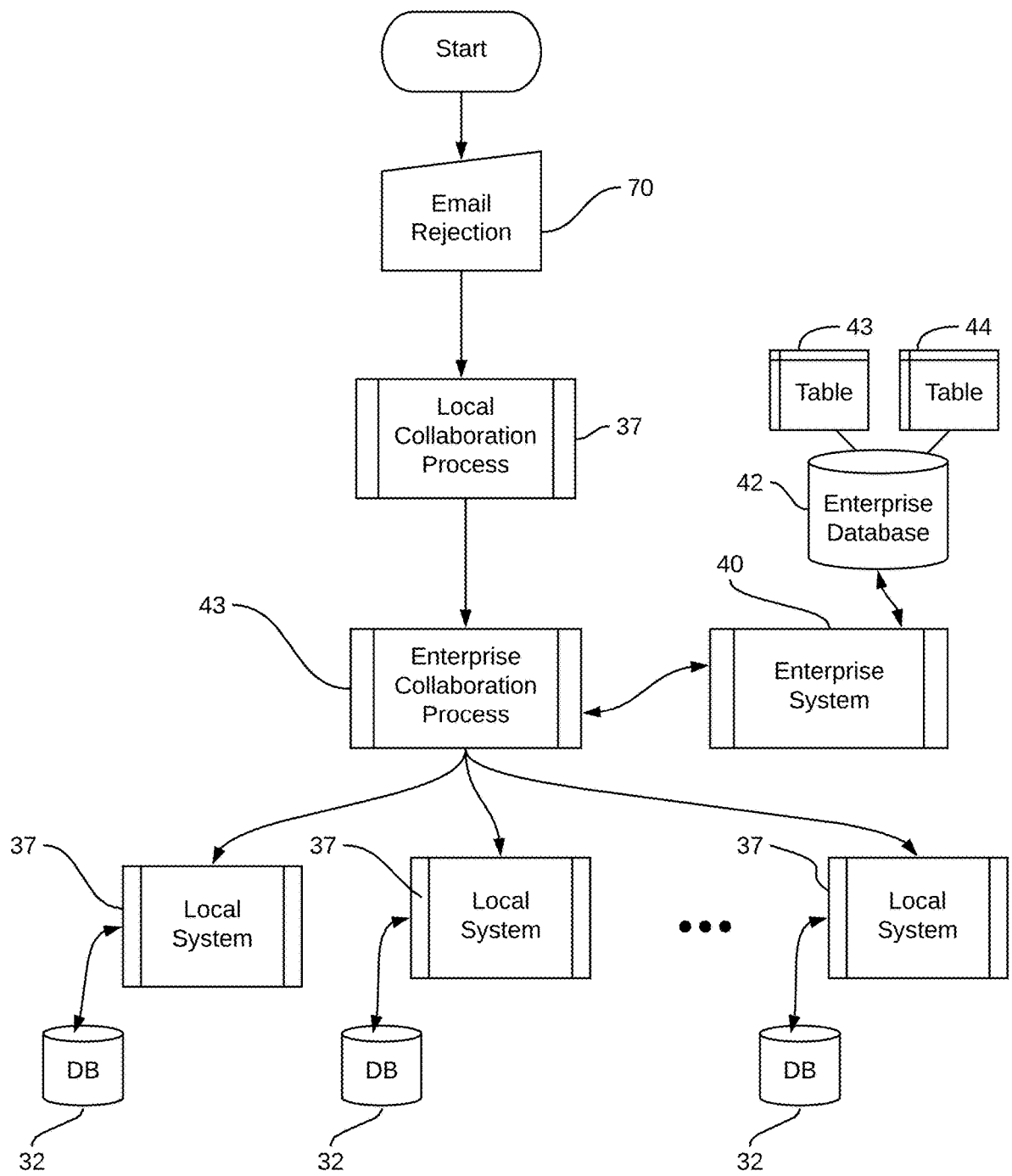
FIG. 4 depicts a flowchart of processing upon the rejection of an email by the email recipient because of its potential for being a phishing or ransomware attack.

FIG. 4 depicts a flowchart of processing upon the rejection of an email by the email recipient because of its potential for being a phishing or ransomware attack. In this instance, the E-Mail Message 11 was examined in a Safe View Mode 60 and it was determined that it represents a cybersecurity threat. After receiving this input the Local Collaboration Process 37 gathers the E-Mail Message 11 and hands it over to the Enterprise Collaboration Process 41 that further hands it over to the Enterprise System 40 for further processing. The Enterprise System 40 performs an analysis of the email headers and records the appropriate origination details, including the email address of the sender, the mail relays utilized, originating domain, and other pertinent information and records it in the Enterprise Database 42, and particularly the Enterprise Level Table of Blacklisted Email Addresses 43. Additionally, the Enterprise System 40 also utilizes a content analysis programs to extract any signatures from the message. If such signatures are detected, they are also saved into the Enterprise Database 42, and more specifically the Enterprise Level Table of Content Patterns 44.

After this analysis has been completed, the Enterprise System 40 informs Enterprise Collaboration Process 41 to proceed with the distribution of the updated data tables to the Local Collaboration Process 37 on each Local System 30. Upon receiving this information, each Local System 30 save it into its Local Database 32 where it is subsequently utilized for monitoring all the incoming emails.

Figure 5:
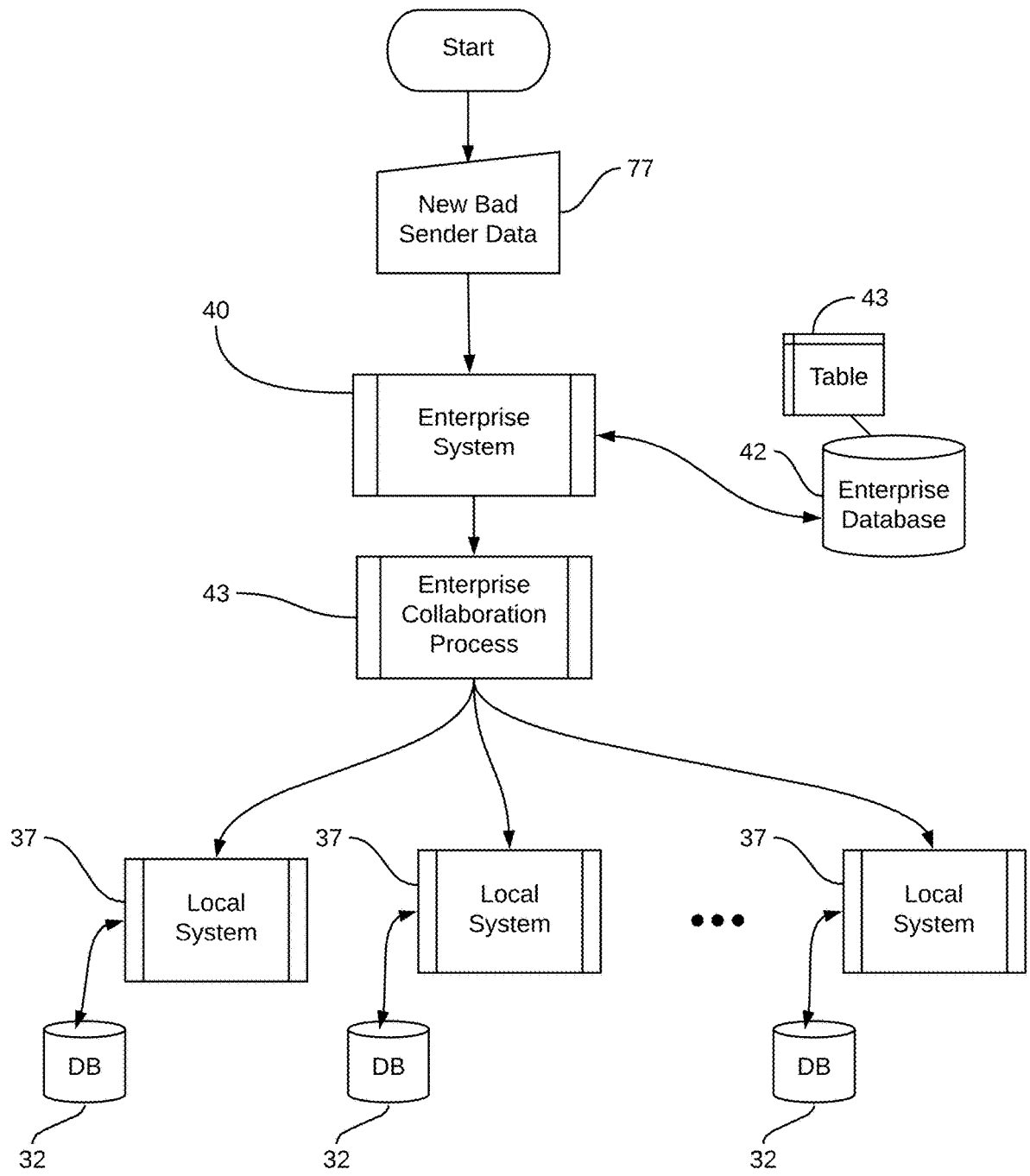
FIG. 5 depicts a flowchart of processing upon the determination by the enterprise security monitor that specific email senders or domains should be blocked from sending any emails to any of the local subsystems because of the known cybersecurity threat.

FIG. 5 depicts a flowchart of processing upon the determination by the enterprise security monitor that specific email senders or domains should be blocked from sending any emails to any of the local subsystems because of the known cybersecurity threat. In this instance, the Enterprise Security Monitors 47 on the basis of information gleaned from suspected emails or otherwise from security reports obtained from third parties may come to conclude that a specific domain, email or email exchanger are a potential security threat. In this case, the New bad sender information 77 is input into Enterprise Database 42, and particularly the Enterprise Level Table of Blacklisted Email Addresses 43. Subsequently, the Enterprise System 40 informs Enterprise Collaboration Process 41 to proceed with the distribution of the updated data tables to the Local Collaboration Process 37 on each Local System 30. Upon receiving this information, each Local System 30 save it into its Local Database 32 where it is subsequently utilized for monitoring all the incoming emails.

Figure 6:
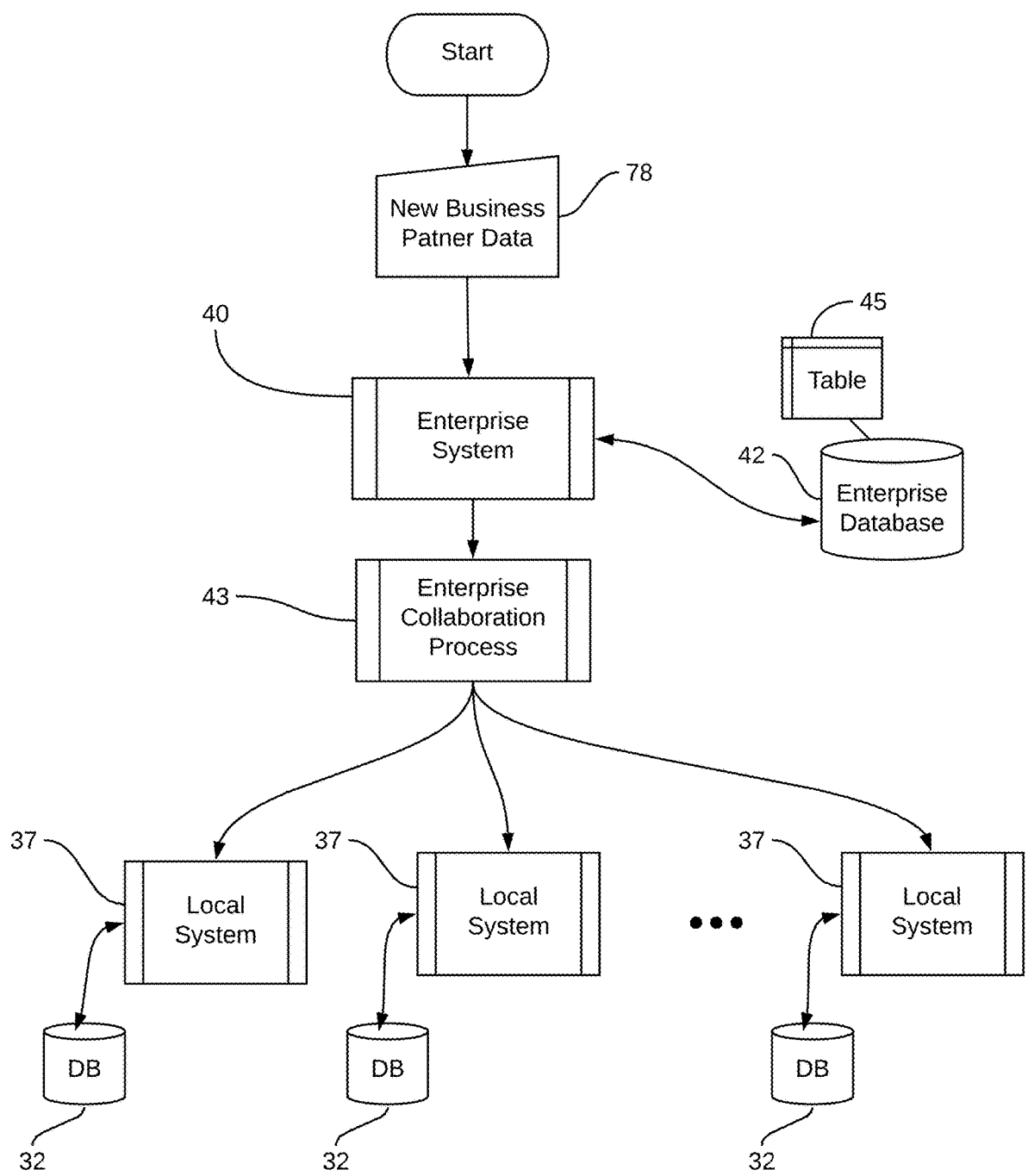
FIG. 6 depicts the flowchart of processing upon the addition by the enterprise security monitor of a new domain that should be treated as a trusted domain.

FIG. 6 depicts the flowchart of processing upon the addition by the enterprise security monitor of a new domain that should be treated as a trusted domain depicting the processing upon the determination by the enterprise security monitor that specific email senders or domains should be blocked from sending any emails to any of the local subsystems because of the known cybersecurity threat. In this instance, the Enterprise Security Monitors 47 based on their known collaborations and partnerships with other businesses, may desire to give preferential treatment to emails originating from a specific domain or a specific set of email addresses. In this case, the New business partner information 78 is input into Enterprise Database 42, and particularly the Enterprise's Table of Trusted Partner Domain Names 45. Subsequently, the Enterprise System 40 informs Enterprise Collaboration Process 41 to proceed with the distribution of the updated data tables to the Local Collaboration Process 37 on each Local System 30. Upon receiving this information, each Local System 30 save it into its Local Database 32 where it is subsequently utilized for monitoring all the incoming emails.

Figure 7:
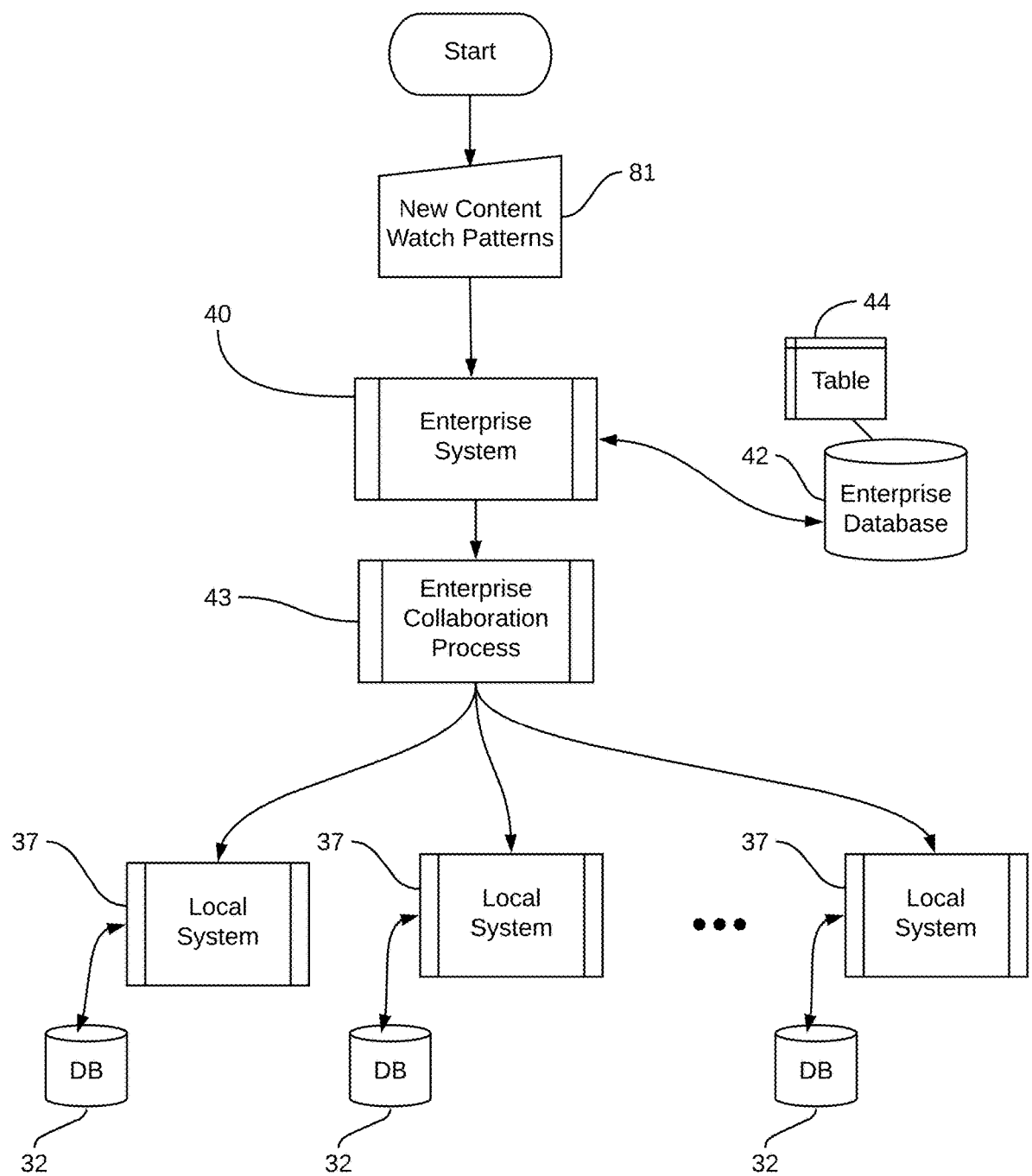
FIG. 7 depicts the flowchart of processing upon the addition by the security monitors of a new content analysis pattern that is to be utilized in filtering incoming email messages.

FIG. 7 depicts the flowchart of processing upon the addition by the security monitors of a new content analysis pattern that is to be utilized in filtering incoming email messages depicting the processing upon the determination by the enterprise security monitor that specific email senders or domains should be blocked from sending any emails to any of the local subsystems because of the known cybersecurity threat.—In this instance, the Enterprise Security Monitors 47 on the basis of analysis of email contents and subject lines used, as well as information obtained from cybersecurity companies that monitor threats need to provide that the local subsystems should reject any emails that match a specific know content pattern. In this case, the New content pattern rule 81 is input into Enterprise Database 42, and particularly the Enterprise Level Table of Content Patterns 44. Subsequently, the Enterprise System 40 informs Enterprise Collaboration Process 41 to proceed with the distribution of the updated data tables to the Local Collaboration Process 37 on each Local System 30. Upon receiving this information, each Local System 30 save it into its Local Database 32 where it is subsequently utilized for monitoring all the incoming emails.

It will be appreciated by a person skilled in the art that the system disclosed rejects messages across the enterprise when they match a known content pattern. As disclosed in FIG. 2 it is only when the email does not contain any known content patterns indicative of a threat, the other rules like origination from a business partner are triggered. Thus, the Local System 30 will reject an E-Mail Message 11 originating from business partner containing content pattern known to be indicative of cybersecurity threat.

Figure 8:
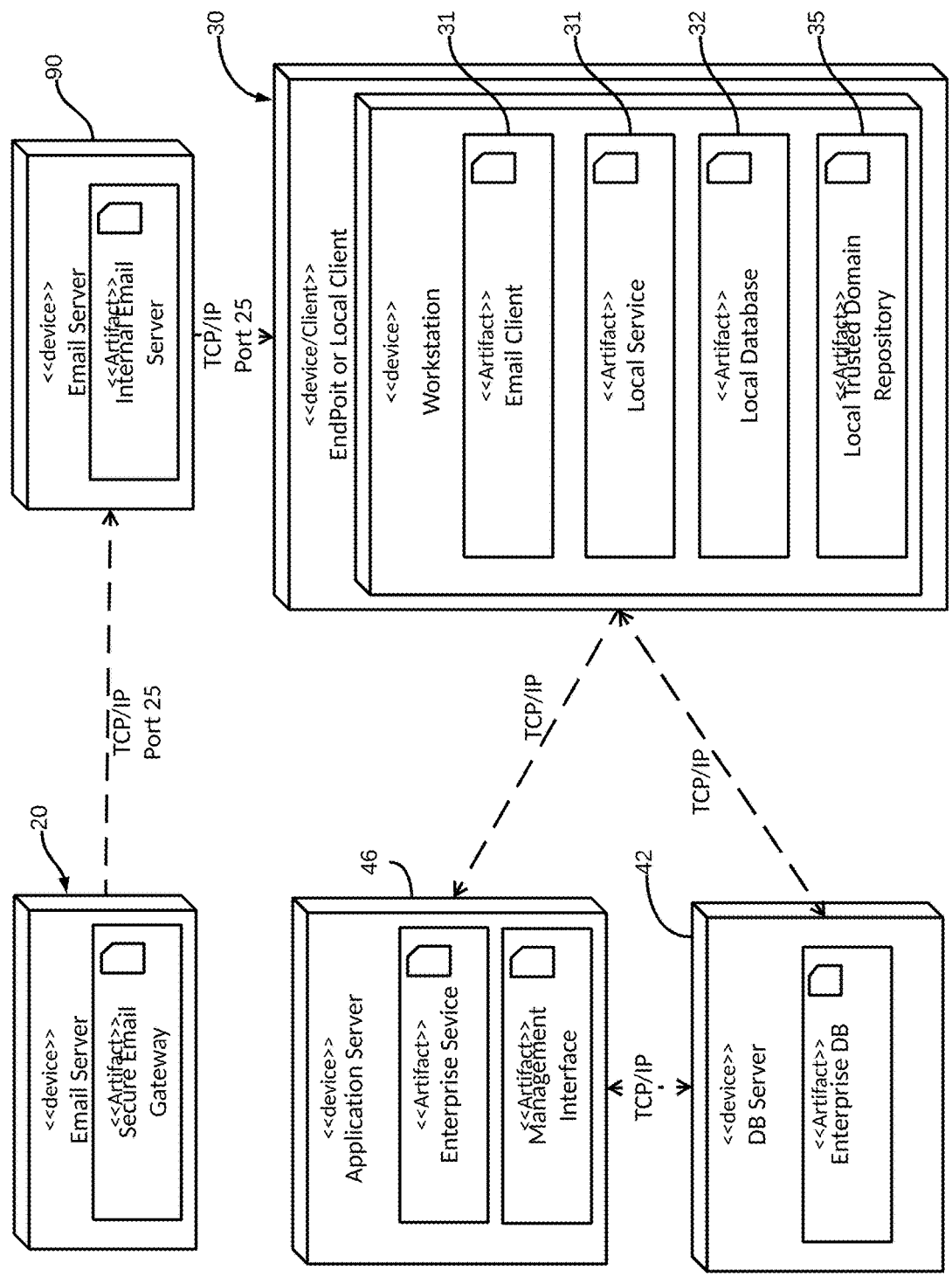
FIG. 8 shows an embodiment of the invention showing the deployment of the software services of the local email monitoring system and the enterprise email monitoring system.

FIG. 8 shows an embodiment of the invention showing the deployment of the software services of the local email monitoring system and the enterprise email monitoring. FIG. 8 depicts the various software components encapsulated and deployed over the Local Area Network 15. Specifically, the endpoint client or Local System 30 encapsulates an email client as part of the Local Message Processor 31 that fetches emails from the E-Mail Server 22. The figure also depicts that software components for the Local Database 32 and Local List of Trusted Partner Domain Names 35 have been encapsulated and loaded into the system memory for the purpose of enhancing performance of the Local System 30. These components are in active collaboration with the components instantiated by the Enterprise System 40.

Figure 9:
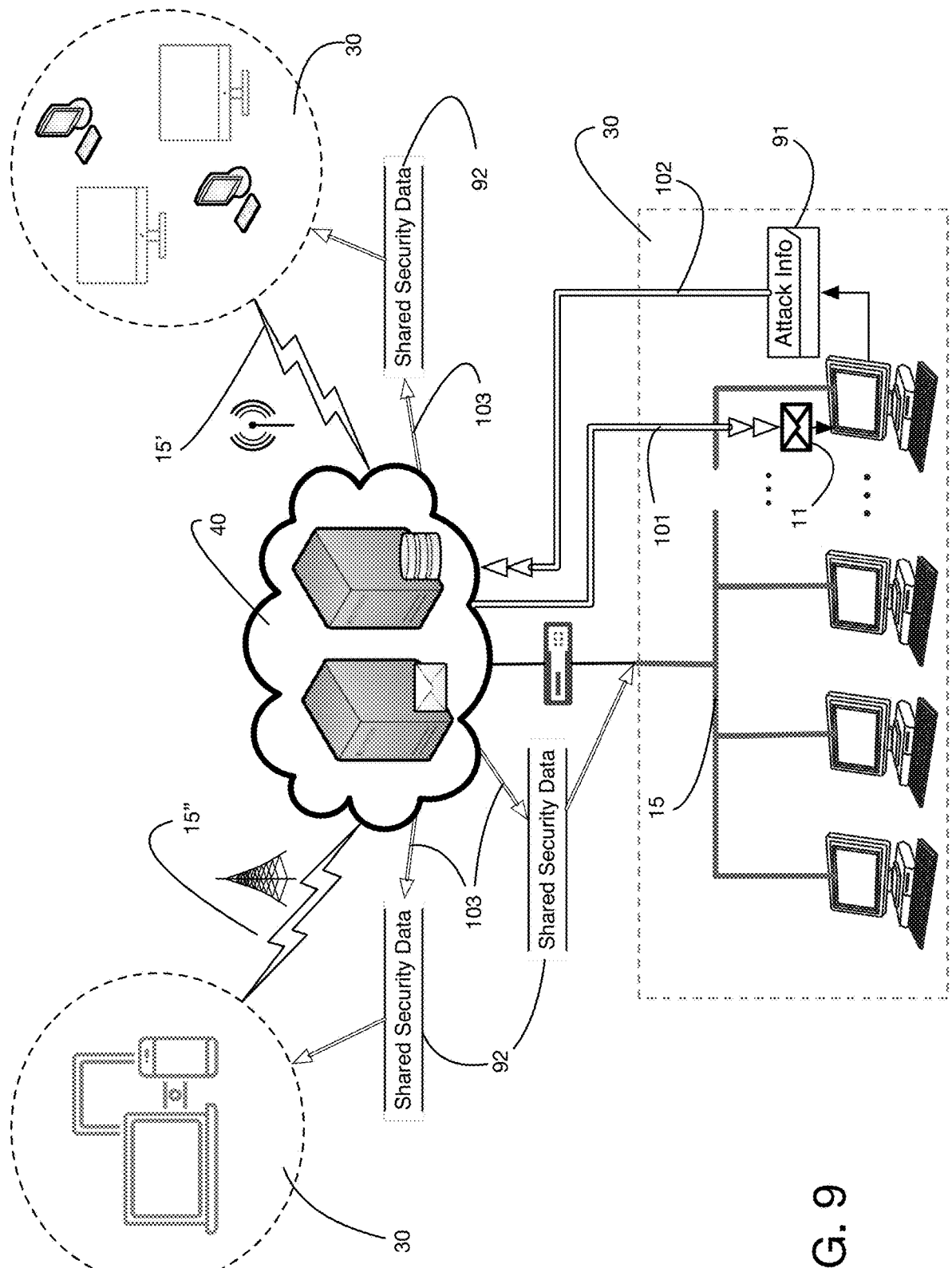
FIG. 9 shows an environmental diagram for the invention depicting the sequence of interaction between the enterprise level email monitoring system and a local email monitoring system, and a subsequent distribution of information to a plurality of local email monitoring systems connected through wired, wireless or cellular networks.

FIG. 9 shows an environmental diagram for the invention depicting the sequence of interaction between the enterprise level email monitoring system and a local email monitoring system, and a subsequent distribution of information to a plurality of local email monitoring systems connected through wired, wireless or cellular network.

FIG. 9 depicts an E-Mail Message 11 received by the Enterprise System 40. The E-Mail Message 11 is received by a local node on the Local System 30. This is depicted as the event labeled 101 in FIG. 9. An analysis of the E-Mail Message 11 by one of the Local System 30 can potentially result in the Local System 30 generating Attack Information from an analysis of a malicious email message by Local System 30 that is communicated over the Local Area Network 15 to the Enterprise System 40. The Attack Information includes data about the type of attack, such as the bad sender attack, or content analysis based, or rejected by the recipient. This communication is denoted as the event labeled 102 in FIG. 9. The Enterprise System 40 analyzes this information and makes appropriated modifications to Enterprise Database 42. These modifications further results in Shared Attack Information which contains data, including modifications to the tables stored in Local Database 32 configured to prevent future attacks in getting communicated to all of the plurality of Local System 30 over the Local Area Network 15. The sharing of intelligence step is annotated as the plurality of events labeled 103 in FIG. 9. As illustrated a Local Area Network 15 can encompass the wired, wireless or radio-signal based cellular Local Area Network 15, 15' or 15", or any other means of communications between the plurality of Local System 30 and the Enterprise System 40. In this manner, the intelligence gained by one email recipient node in recognizing an email to be malicious is distributed to all the nodes.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between. The foregoing description is illustrative of particular embodiments of the invention but is not meant to be a limitation upon the practice thereof. The following claims, including all equivalents thereof, are intended to define the scope of the invention.

While preferred embodiments of the present invention are shown and described, it is envisioned that those skilled in the art may devise various modifications without departing from the spirit and scope of the foregoing description.

What is claimed is:

1. A process for securing email delivery comprising:
    having a local system, where a local system includes a processor configured to execute computer implemented methods, a database of security rules, a network interface, and a user interface;
    having a local system receive an email over the network interface;
    having the local system receive a classification value selected from a plurality of classification values for the email by applying the security rules to the email to produce the plurality of classification values comprising at least a first classification value, a second classification value, and a third classification value;
    having the local system cause
        a deletion of the email for the first classification value,
        a display of the email in a safe mode for the second classification value wherein at least all hyperlinks and attachments of the received email are disabled, or
        a display of the email in a normal mode different from the safe mode for the third classification value;
    having the local system receive a user input in response to the display of the email in the safe mode, and further having the local system send the displayed email and the received user input to an enterprise system upon receiving an affirmative input from the user, and
    having the local system cause the enterprise system to change one or more of the security rules, or add one or more new security rules, in response to the forwarding of the email and the user input and having the enterprise system communicate the changes to the security rules to a plurality of local systems.

2. The process of claim 1 wherein
    the email further includes a plurality of file attachments and a plurality of active components where the active components are configured to cause an action, where
    the display of the email in the normal mode is configured to allow a viewing and a saving of the file attachments and allow the actions of the active components, and
    the display of the email in the safe mode is configured to further disable the actions of the active components.

3. The process of claim 1 further
    having the email include a header and a body;
    having the database of security rules include a plurality of content patterns wherein each content pattern represents one or more of predefined character strings; and
    having the computer implemented method produce the first classification value where at least one of the content patterns matches the header or matches the body of the email.

4. The process of claim 1 further
    having the email include a metadata comprising a sender email identifier;
    having the database of security rules include a plurality of a blacklisted email identifier patterns wherein each blacklisted email pattern represents one or more of predefined email addresses, and
    having the computer implemented method produce the first classification value when at least one of the blacklisted email identifier patterns matches the sender email identifier.

5. The process of claim 1 further
    having the email include a metadata comprising a plurality of sender gateway addresses;
    having the database of security rules include a plurality of blacklisted gateway patterns wherein each blacklisted gateway pattern represents one or more of predefined gateway addresses, and
    having the computer implemented method produce the first classification value when at least one of the blacklisted gateway patterns matches at least one of the plurality of sender gateway addresses.

6. The process of claim 1 further
    having the email includes
        a header,
        a body, and
        a metadata wherein the metadata further includes
            a recipient email identifier including a recipient Internet domain,
            a sender email identifier including a sender Internet domain,
            a sender email server address, and
            a plurality of sender gateway addresses;
    having the database of security rules include
        a plurality of content patterns wherein each content pattern represents one or more of predefined character strings,
        a plurality of a blacklisted email identifier patterns wherein each blacklisted email identifier pattern represents one or more of predefined email identifiers,
        a plurality of blacklisted gateway patterns wherein each blacklisted gateway pattern represents one or more of predefined gateway addresses,
        a plurality of internal gateway patterns wherein each internal gateway pattern represents one or more of predefined internal gateway addresses, and a plurality of trusted partner patterns wherein each trusted partner pattern represents one or more of predefined Internet domains.

7. The process of claim 6 further having the computer implemented method produce the second classification where content patterns fail to match the header or the body of the email, blacklisted email identifier patterns fail to match the sender email identifier, blacklisted gateway patterns fail to match the sender gateway addresses, and trusted partner patterns fail to match the sender Internet domain.

8. The process of claim 6, further having the computer implemented method produce the third classification where content patterns fail to match the header or the body of the email, blacklisted email identifier patterns fail to match the sender email identifier, blacklisted gateway patterns fail to match the sender gateway addresses, and trusted partner patterns matches the sender Internet domain.

9. The process of claim 6, further having the computer implemented method produce the second classification where
   the sender Internet domain and the recipient Internet domain have an identical value, and
   internal gateway pattern fails to match at least one the plurality of sender gateway addresses.

10. The process of claim 6, further having the computer implemented method produce the third classification where
    the sender Internet domain and the recipient Internet domain have an identical value, and
    internal gateway pattern matches all of the plurality of sender gateway addresses.

11. A system for securing email delivery comprising:
    an enterprise system and a plurality of local systems with each of the local systems adapted to receive an email and further includes
        a local hardware processor configured to execute a local computer implemented method,
        a local database of security rules,
        a local network interface configured to communicate with an enterprise network interface, and
        a user interface;
        wherein the local hardware processor executes the local computer implemented method performing the steps of
            analyzing the email, using one or more security rules,
            producing a plurality of security threat level for the email comprising at least a first classification value, a second classification value and a third classification value wherein at least all hyperlinks and attachments of the email are disabled, and
            performing one or more a plurality of actions on the email where the action performed is a function of the security threat level, wherein one of the actions includes a deletion of the email for the first classification value,
            performing a display of the email in a safe mode for the second classification value,
            performing a display in a normal mode different from the safe mode for a third classification value, and receiving an input from a user in response to the display of the email in the safe mode, and
            forwarding the displayed email and the received user input to the enterprise system;
    the enterprise system configured to receive the displayed email and the received user input from any of the plurality of local systems, and further includes
        an enterprise hardware processor configured to execute an enterprise computer implemented method,
        an enterprise database of enterprise security rules,
        the enterprise network interface configured to communicate with each of the plurality of local network interfaces; wherein the enterprise hardware processor executing the enterprise computer implemented method performs the steps of
            analyzing the received email, the received user input responsive to the display of the email in the safe mode associated with the local system, and the enterprise security rules,
            determining if enterprise security rules need updating, and
            creating new enterprise security rules, updating the enterprise security rules, or creating new enterprise security rules and updating enterprise security rules, and
            communicating the new or the updated enterprise security rules to the plurality of local systems over the enterprise network interface.

12. The system of claim 11 wherein
    each of the plurality of local systems are configured to receive the new or the updated enterprise security rules from the enterprise server and perform an update of their respective local databases of the local security rules to be in a synchronization with the enterprise database of security rules.

13. The system of claim 11 wherein
    one of the plurality of actions performed by the local computer implemented method is a deletion of the email.

14. The system of claim 13 wherein
    the email further includes
    a header,
    a body, and
    a metadata wherein the metadata includes
        a recipient email identifier including a recipient Internet domain,
        a sender email identifier including a sender Internet domain,
        a sender email server address, and
        a plurality of sender gateway addresses; and
    deletion of the email results having the local computer implemented method bypassing the user input step and forwarding of the metadata of the email and a special code to the enterprise system.

15. The system of claim 13 wherein the deletion of the email results in having the local computer implemented method bypassing the user input step and forwarding of the email and a special code to the enterprise system.

16. The system of claim 11 wherein
    the enterprise system further includes an enterprise user interface; and
    the enterprise computer implemented method is configured to receive an input from the enterprise user interface, wherein the enterprise user input is further included in the step of
    analyzing the email, the user input, and the enterprise security.

17. The system of claim 11 wherein
    the email further includes a plurality of file attachments and a plurality of active components where the active components are configured to cause an action, where the performing of the display of the email by the local computer implemented method in the safe mode is further configured to disable the actions of the active components.

18. A process for securing email delivery comprising:

having a computer system, where a system includes a processor configured to execute software programmed methods, and a network interface;

having a computer system receive an email over the network interface;

having the computer system receive a classification value for the email from a first software programmed method;

having the computer system cause
a display of the email in a safe mode for a predefined classification value,
wherein at least all hyperlinks and attachments of the received emails are disabled,
and having the computer system receive an input corresponding to the safe mode display of the received email, and further having the first software programmed method
perform an analysis of the received email and the corresponding input and determine whether updating a security rule is required and updating the security rule if required, and
communicate the updated security rule to a plurality of computer systems connected to the network interface.

19. The process of claim 18 wherein
the computer system further includes and a user interface, and a database of security rules,
the display of the email in the safe mode is further configured to receive a user input and execute a second software method configured to use the email and the user input to update the database of security rules.

20. The process of claim 19 wherein
the second software programmed method is configured to communicate the updated security rules over the network interface to an enterprise server connected to the network.

* * * * *